No. 68,536.
H. M. SMITH.
HAY KNIFE.
PATENTED SEPT. 3, 1867.
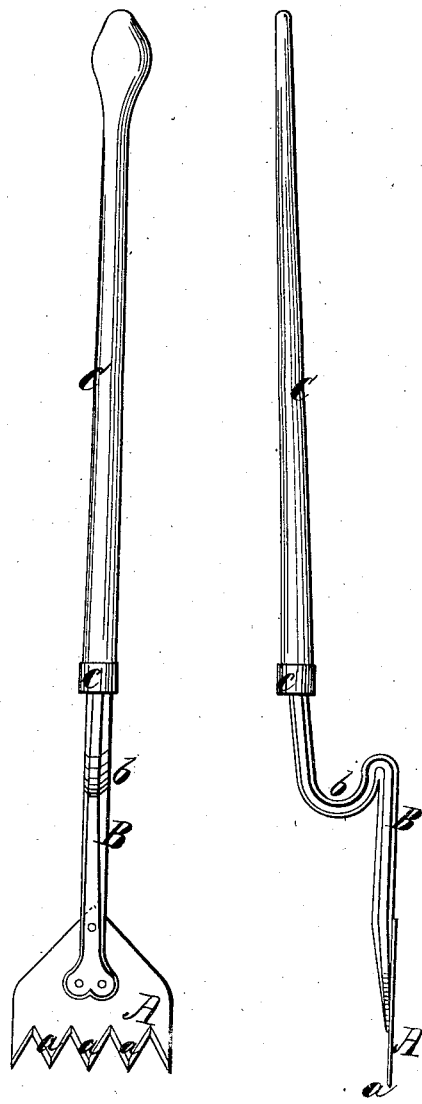

No. 68,536.
H. M. SMITH.
HAY KNIFE.
PATENTED SEPT. 3, 1867.
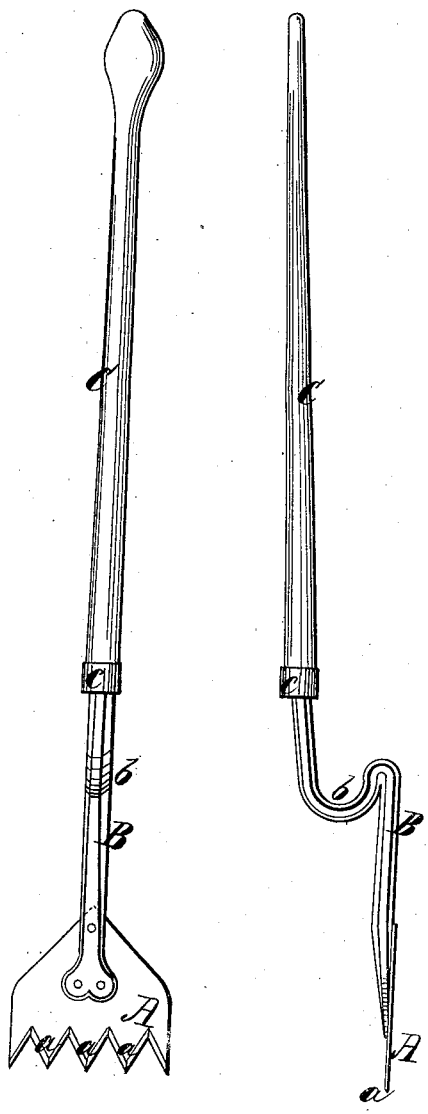
Fig: 1.  Fig: 2.
Witnesses:
Thos Inseke
Wm Trewin
Inventor:
H M Smith
Per Munn &c
Attorneys

United States Patent Office.

HARMON M. SMITH, OF KALAMAZOO, MICHIGAN.

Letters Patent No. 68,536, dated September 3, 1867.

---

IMPROVEMENT IN HAY-KNIVES.

---

The Schedule referred to in these Letters Patent and making part of the same.

---

TO ALL WHOM IT MAY CONCERN:

Be it known that I, H. M. SMITH, of Kalamazoo, in the county of Kalamazoo, and State of Michigan, have invented a new and improved Hay-Knife, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved hay-knife for cutting hay from the mow or stack; and it consists in a peculiar construction of the knife, as hereinafter fully shown and described, whereby hay or straw may be cut from the mow or stack with the greatest facility and with a moderate expenditure of power. In the accompanying sheet of drawings—

Figure 1 is a front view of my invention.

Figure 2, a side view of the same.

Similar letters of reference indicate like parts.

A represents the blade of the knife, constructed of steel plate, which may be about a sixteenth of an inch in thickness, about eight inches in width, and with oblique converging sides, as shown in fig. 1. The blade has its cutting edge formed of V-shaped or pointed teeth, which are sharpened or brought to a cutting edge by a basil or bevel, $a$, at one side. The blade A is riveted to a metal shank, B, which is made of an iron bar, of round or other form, and three-fourths of an inch in thickness. This shank is bent to form a semicircle, $b$, at about fourteen inches from the teeth of the blade. This semicircular portion of the shank serves as a foot-piece in pressing the knife into the hay or straw, and also causes the blade to be out of line with the handle C of the implement, but nearly parallel therewith. The upper end of the shank is pointed and driven into the end of the handle C, which is of wood, and provided with a ferrule, $c$.

In using the implement it is held in a vertical position and forced into the hay or straw by the pressure of one foot in the semicircular portion $b$ of the shank. The weight of the operator assists materially in forcing the blade down into the hay or straw. The foot need not be removed from the semicircular part $b$, the operator stepping along one step with the unemployed foot at the termination of each downward stroke or cut of the knife. The feet should be used alternately, changing at the termination of the length of the whole cut at each side of the mow in order to insure the greatest ease in using the device.

The motions necessary in operating the knife are natural ones, and not such as would tend to fatigue the operator. In this respect it is believed that my invention possesses a superior advantage over those now used for a like purpose.

Having thus described my invention, I claim as new, and desire to secure by Letters Patent—

The blade A, in combination with the shank B, curved or bent to form a semicircular foot-piece, $b$, and fitted in a handle, C, all arranged substantially in the manner as and for the purpose specified.

HARMON M. SMITH.

Witnesses:
 ROLLIN WOOD,
 RUFUS H. GROSVENOR.